US009450652B2

(12) United States Patent
Takei

(10) Patent No.: US 9,450,652 B2
(45) Date of Patent: Sep. 20, 2016

(54) RADIO COMMUNICATION SYSTEM, TRANSMITTER, RECEIVER, ELEVATOR CONTROL SYSTEM, AND SUBSTATION FACILITY MONITORING SYSTEM

(71) Applicant: Hitachi, Ltd., Tokyo (JP)

(72) Inventor: Ken Takei, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/769,213

(22) PCT Filed: Feb. 22, 2013

(86) PCT No.: PCT/JP2013/054449
§ 371 (c)(1),
(2) Date: Aug. 20, 2015

(87) PCT Pub. No.: WO2014/128906
PCT Pub. Date: Aug. 28, 2014

(65) Prior Publication Data
US 2015/0381242 A1 Dec. 31, 2015

(51) Int. Cl.
*H04B 7/02* (2006.01)
*H04L 1/02* (2006.01)
(Continued)

(52) U.S. Cl.
CPC ............... *H04B 7/028* (2013.01); *H04B 1/04* (2013.01); *H04B 1/16* (2013.01); *H04B 7/10* (2013.01)

(58) Field of Classification Search
CPC ............... H03F 1/3247; H03F 1/3294; H03F 2201/3233; H04L 27/368; H04L 25/03343; H04L 1/06; H04L 27/2647; H04B 7/0845; H04B 7/0854; H04B 7/0857

USPC .......................................... 375/259–352, 139
See application file for complete search history.

(56) References Cited

U.S. PATENT DOCUMENTS 5,469,475 A 11/1995 Voorman
5,691,727 A * 11/1997 Cyzs .................. H04B 7/10
342/188
(Continued)

FOREIGN PATENT DOCUMENTS

JP 4-233357 A 8/1992
JP 06-061894 A 3/1994
(Continued)

OTHER PUBLICATIONS

International Search Report of PCT/JP2013/054449.

*Primary Examiner* — James M Perez
(74) *Attorney, Agent, or Firm* — Mattingly & Malur, PC

(57) ABSTRACT

The radio communication system includes a radio transmitter which performs up-sampling on an information signal, and performs modulation on a carrier wave using the sampled information signal to transmit the modulated carrier wave, and a radio receiver which receives transmission waves transmitted from the radio transmitter, and demodulates the information signal. The radio transmitter includes a transmission processing unit that generates the transmission waves, and a transmission unit that rotates polarized waves of the transmission waves with a predetermined rotation frequency, and wirelessly transmits the transmission waves, and the transmission processing unit copies the sampled information signal, multiplies the copied information signals by predetermined weighting factors, and generates the transmission waves by assigning the information signals on a time axis such that the copied information signals are respectively transmitted with different polarization angles.

15 Claims, 10 Drawing Sheets

(51) Int. Cl.
*H04B 7/10* (2006.01)
*H04B 1/04* (2006.01)
*H04B 1/16* (2006.01)

(56) References Cited

U.S. PATENT DOCUMENTS

| | | | | |
|---|---|---|---|---|
| 7,917,093 | B2* | 3/2011 | Takei | H04B 7/10 |
| | | | | 455/42 |
| 8,090,044 | B2* | 1/2012 | Rofougaran | H01L 23/66 |
| | | | | 375/259 |
| 9,219,506 | B2* | 12/2015 | Takei | H04B 1/0483 |
| 2008/0170533 | A1* | 7/2008 | Cyzs | H04B 5/02 |
| | | | | 370/315 |
| 2010/0074355 | A1 | 3/2010 | Nguyen et al. | |
| 2010/0081467 | A1* | 4/2010 | Alex | H04L 5/0023 |
| | | | | 455/509 |
| 2010/0290552 | A1* | 11/2010 | Sasaki | H04B 7/0413 |
| | | | | 375/267 |
| 2011/0150114 | A1* | 6/2011 | Miao | H04B 7/0417 |
| | | | | 375/260 |
| 2011/0188552 | A1* | 8/2011 | Yoon | H04B 1/38 |
| | | | | 375/219 |
| 2011/0228713 | A1* | 9/2011 | Alexopoulos | H01Q 1/521 |
| | | | | 370/297 |
| 2012/0287978 | A1* | 11/2012 | O'Keeffe | H01Q 21/245 |
| | | | | 375/222 |
| 2013/0107991 | A1* | 5/2013 | Hinson | H01Q 19/30 |
| | | | | 375/340 |
| 2013/0336417 | A1 | 12/2013 | Takei | |
| 2014/0146902 | A1* | 5/2014 | Liu | H04B 7/0689 |
| | | | | 375/260 |
| 2015/0063487 | A1* | 3/2015 | Negus | H04B 7/0486 |
| | | | | 375/267 |

FOREIGN PATENT DOCUMENTS

JP 2009-506582 A 2/2009
WO 2012/120657 A1 9/2012

* cited by examiner

Fig. 2
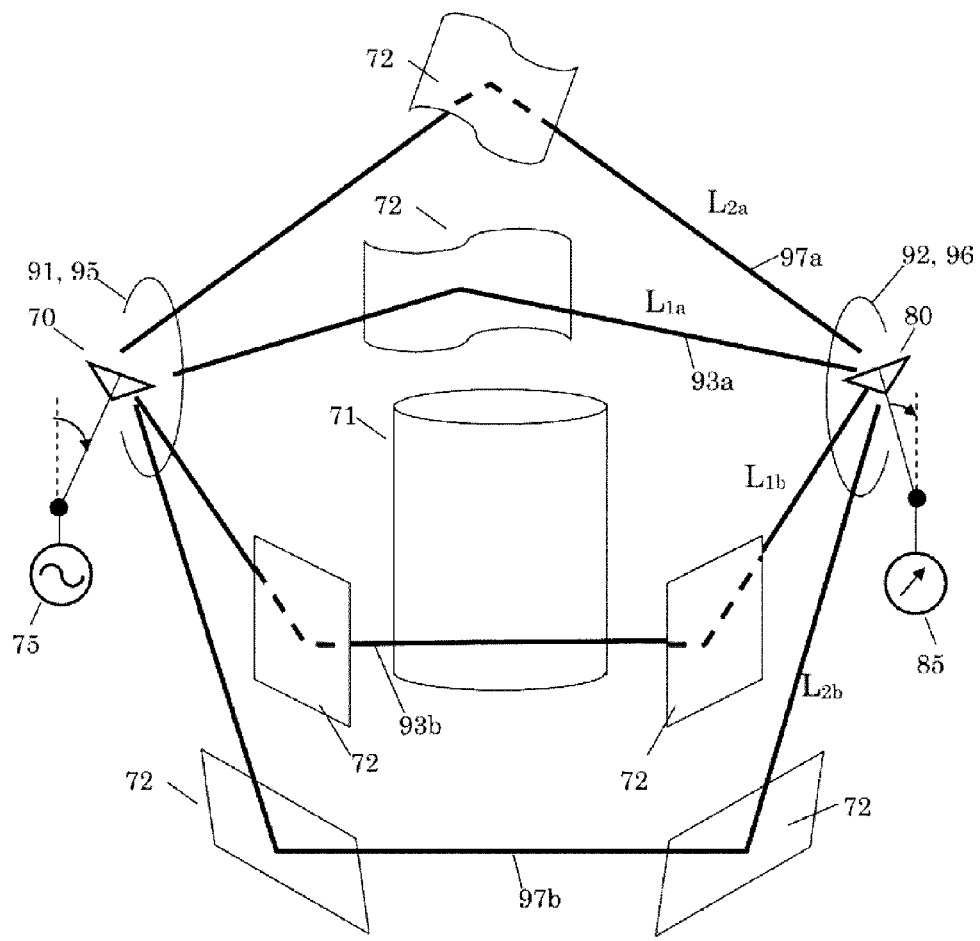
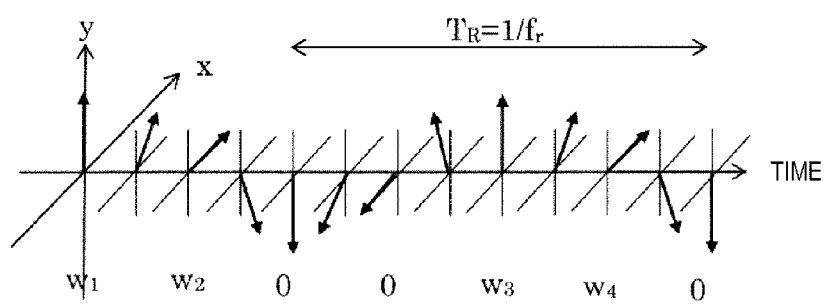

Fig. 5
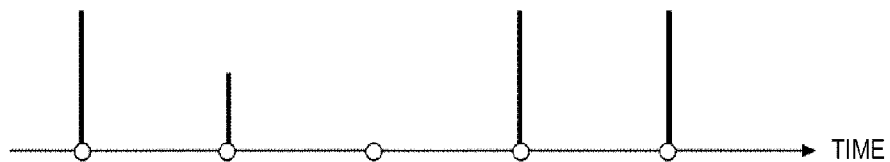
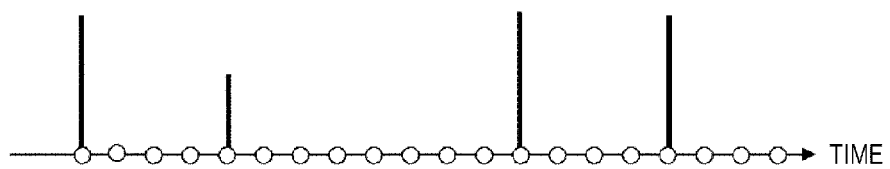
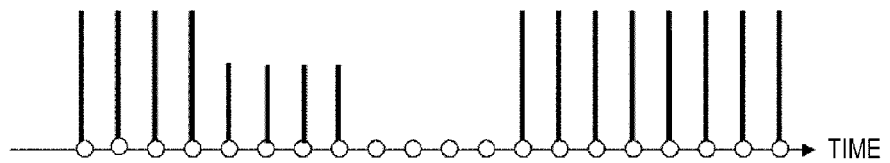
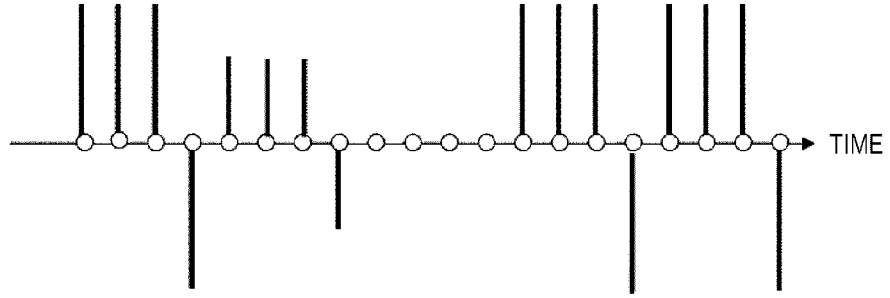

RADIO COMMUNICATION SYSTEM, TRANSMITTER, RECEIVER, ELEVATOR CONTROL SYSTEM, AND SUBSTATION FACILITY MONITORING SYSTEM

TECHNICAL FIELD

The present invention relates to a radio communication system and the like.

BACKGROUND ART

A radio communication technology that has been significantly developed in the field of broadcasting and communication has sequentially overcome problems of interruption and an update non-allowable region unique to radio, and has launched into the field of control and observation requiring high reliability in a communication line in comparison with a phone call, and listening and watching by improving reliability of a communication line. Especially in a social infrastructure device, reliability of communication means is higher than a device for general consumers, but application of a radio technology to the communication means has been examined in this field. In such a social infrastructure device, there is a need for high reliability in communication quality.

In a radio device, electromagnetic waves that propagate in free space are used as a transmission medium of communication, but the frequency of the electromagnetic waves that can wirelessly propagate in real space ranges from 300 MHz to 3 GHz. In the frequency which is equal to or less than the aforementioned range, radiation efficiency of radio waves in the air is significantly decreased, whereas in the frequency which is equal to or greater than the aforementioned range, since electromagnetic wave energy is greatly attenuated due to a scattering phenomenon arising from interruption, reflection or diffraction occurring when the radio waves propagate in the air, it is difficult to maintain the distance between transmission and reception points. Thus, communication is performed in only a nearby region, and it is difficult to realize radio communication in the broad sense. At present, an operation frequency of a general-purpose digital device is increased to from several hundreds of MHz to several GHz, and it is possible to introduce a digital circuit to a device that performs radio communication.

As the radio communication technology using such a digital circuit, PTL 1 describes a technology in which in communication using electromagnetic waves on which information received from a transmission side through different paths is superimposed, means for increasing the amount of the information by using the paths which have been increased in number or improving transmission reliability of the information digitizes information to be transmitted, performs quadrature modulation on a digitized signal using a special symbol, and transmits the processed signal, and a reception side separates the received signals at once using the symbol, so that the amount of information is increased or the transmission reliability of the information is increased.

CITATION LIST

Patent Literature

PTL 1: JP-T-2009-506582

SUMMARY OF INVENTION

Technical Problem

In an environment in which a social infrastructure radio device is provided, since the primary operation purpose of the radio device is to control or monitor the social infrastructure device, the dimensions thereof are much greater than those of the devices for consumers, and the social infrastructure device itself that is solidly made of a metal becomes the source of electromagnetic waves used for radio communication that are scattered. Thus, the radio communication is performed in an environment in which multipath waves generated due to the scattering interfere with each other. For this reason, there is a technical problem in realizing the radio communication with high reliability in the multipath-wave interference environment. When a difference between distances by which a plurality of electromagnetic waves reaches a reception point from a transmission point is an odd-number of times of a half-wave length, the energy thereof becomes zero by being offset due to the interference, and thus, a failure in communication may occur.

As one technology for solving the problem, there is a technology for suppressing a state where the energy of the electromagnetic waves is offset due to the interference by using a plurality of transmission antennas, a plurality of reception antennas or a plurality of both antennas and separating these antennas with a distance which is equal to or greater than half of the wavelength of the electromagnetic waves used for communication. However, in this technology, a new problem in that the dimensions of the transmitter and the receiver including the antennas are increased may occur.

As another technology for solving the problem, there is a method using the polarized waves of the electromagnetic waves. Two independent polarized waves perpendicular to each other are present in the electromagnetic waves, and when the electromagnetic waves are reflected by a scatterer such as a social infrastructure device, a specific change in the polarization direction is caused by the directions of the polarized waves incident on the scatterer. Specifically, the direction of the polarized wave perpendicular to a tangential plane of the surface of the scatterer is maintained, and the direction of the polarized wave horizontal to the tangential plane is changed by 180 degrees.

Accordingly, the rotation angles of the polarized waves of the electromagnetic waves are determined by the incidence angles of the electromagnetic waves incident on the scatterer. Since the multipath waves have a plurality of waves reflected by the scatterer as components, the rotation directions of the multipath waves are different. When these different rotation directions can be detected and divided, it is possible to avoid a phenomenon in which the energy of the electromagnetic waves becomes zero due to the interference of the multipath waves.

The electromagnetic waves are transmitted by fixing the direction of a certain polarized wave, and the energy of the electromagnetic waves becomes zero due to the interference of the multipath waves at the reception point. Since this means that the polarized waves of the transmitted electromagnetic waves have the rotation directions of the same polarized waves such that the two electromagnetic waves are offset at the reception point. Thus, when the directions of the polarized waves of the electromagnetic waves transmitted in this state are changed, since the rotation directions of the polarized waves caused by the reflections of the radio waves from the surface of the scatterer which is the source of the generation of the multipath waves are changed, the polarized waves of the electromagnetic waves interfering at the reception point are not the same except for under special conditions. For this reason, the energy of the electromagnetic waves does not become zero at the same transmission point due to the independence of the polarized waves of the electromagnetic waves.

As mentioned above, there are several situations where the energy of the electromagnetic waves reaching the reception side from the transmission side does not become zero in an environment in which many electromagnetic-wave scatterers are present between the transmission side and the reception side. These situations can be distinguished by the initial polarization directions of the polarized waves being rotated since the directions of the polarized waves reaching the reception side are different by the initial polarization direction of the polarized waves transmitted from the transmission side. In other words, since the paths of the electromagnetic waves reaching the reception side from the transmission side are different due to the initial polarization directions on the transmission side, it is possible to multiplex the communication path reaching the reception side from the transmission side by using these different paths, and it is possible to improve the reliability of communication quality by using the multiplexed communication paths. For example, by transmitting the same information through the respective communication paths by using the multiplexed communication paths, an interception ratio of an effective communication path between the transmission side and the reception side due to external disturbance is significantly reduced, and thus, it is possible to achieve highly reliable of communication.

Here, in a technology described in PTL 1, information to be transmitted is encoded in a time-axis direction under the conditions in which a plurality of transmission paths between the transmission side and the reception side is fixed over time. Thus, it is difficult to apply this technology to a case where a plurality of electromagnetic waves having different polarization directions over time is radiated and a plurality of paths provided between the transmission side and the reception side is different.

That is, when the electromagnetic waves radiated from the transmission side in the different polarization directions pass through the different paths and are detected at the reception side in the different polarization direction, since the independent polarized waves of the electromagnetic waves are only two components perpendicular to each other, the electromagnetic waves having different polarization angles are not independent unless the electromagnetic waves are perpendicular to each other. Accordingly, it is not guaranteed that the reliability of the signal superimposed on the electromagnetic waves which pass through the different paths and are detected at the reception side in the different polarization directions can be constantly improved by the increasing number of transmission paths by using the different paths.

The problem to be solved by the invention is to increase communication reliability between a transmitter and a receiver in a radio wave environment in which electromagnetic waves emitted from the transmitter are multiple-reflected by a scatterer and reach the receiver.

Solution to Problem

In order to solve the problems described above, the present invention provides a radio communication system that includes a radio transmitter which performs up-sampling on an information signal, and performs modulation on a carrier wave using the sampled information signal to transmit the modulated carrier wave, and a radio receiver which receives transmission waves transmitted from the radio transmitter, and demodulates the information signal. The radio transmitter includes a transmission processing unit that generates the transmission waves, and a transmission unit that rotates the polarized waves of the transmission waves with a predetermined rotation frequency, and wirelessly transmits the transmission waves, and the transmission processing unit copies the sampled information signal, multiplies the copied information signals by predetermined weighting factors, and generates the transmission waves by assigning the information signals on a time axis such that the copied information signals are respectively transmitted with different polarization angles.

Advantageous Effects of Invention

According to the present invention, it is possible to increase communication reliability between a transmitter and a receiver in a radio wave environment in which electromagnetic waves emitted from the transmitter are multiple-reflected by a scatterer and reach the receiver.

BRIEF DESCRIPTION OF DRAWINGS

FIG. 2 is a diagram for describing an operating principle of the radio communication system according to the present invention.

FIG. 5 is an example of digital signal processing applied to the radio communication system according to the present invention.

DESCRIPTION OF EMBODIMENTS

Hereinafter, embodiments will be described with reference to the drawings.

Embodiment 1

In the present embodiment, a configuration example of a transmitter and a receiver applied to a radio communication system of the present invention will be described.

Figure 1:
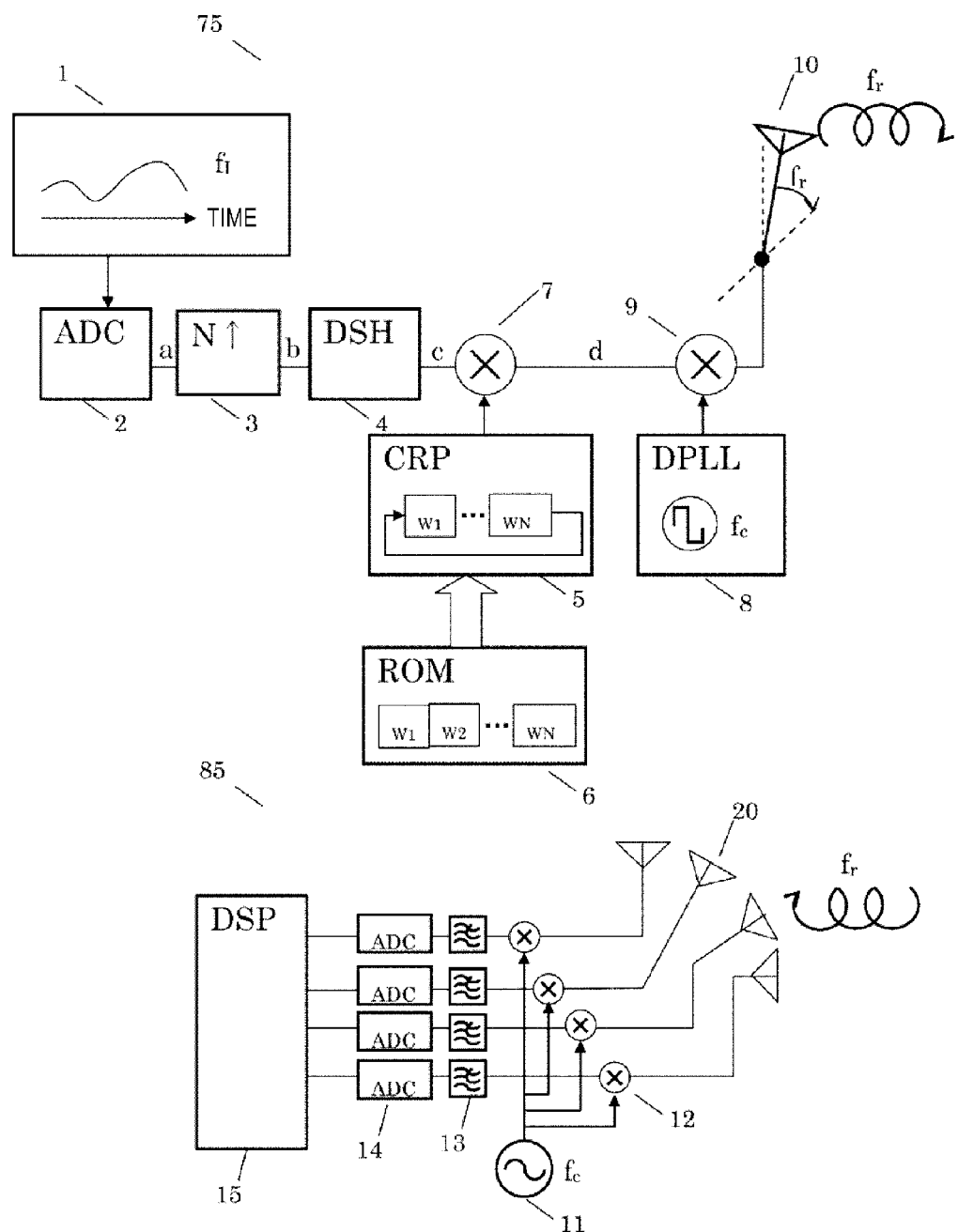
FIG. 1 is an example of a configuration diagram of a transmitter and a receiver applied to a radio communication system according to the present invention.

FIG. 1 is an example of a configuration diagram of a transmitter and a receiver that realize the radio communication system of the present embodiment. In a transmitter 75, a signal having a frequency bandwidth fI generated by an information generating circuit 1 is converted into a digital signal by an analog-to-digital converter 2, and a sampling frequency is raised using an up-sampler 3. New signal points are formed between discrete intervals of an original digital signal, and the values of the original digital signal are copied onto the new signal points by a digital sample-hold circuit 4.

Weighting factors are previously stored in a storage device 6, and a circulation-type signal copying device 5 reads the weighting factors from the storage device 6. A first multiplier 7 multiplies digital outputs of the digital sample-hold circuit 4 using the read weighting factors in sequence, and a second multiplier 9 multiplies the multiplied results using a digital carrier wave which has a frequency fc and is generated by a digital oscillator 8. The signal is radiated into the air through a transmission antenna 10 rotated with a frequency fr lower than the sampling frequency fc of the digital oscillator 8, as electromagnetic waves of which polarization directions are rotated at the frequency fr over time.

A receiver 85 includes a plurality of linearly polarized antennas 20 having different polarization directions, and analog mixers 12 in which an output of a local oscillator 11 that generates a sine wave having the frequency of the carrier wave of the electromagnetic wave radiated from the transmitter is mixed, analog filters 13 that remove unnecessary components from the outputs of the mixers 12, and analog-to-digital converters 14 that convert outputs of the analog filters 13 into digital signals and are respectively cascade-connected to the plurality of linearly polarized antennas 20. In such a configuration, signals input from the antennas are converted into digital signals, and are input to a digital signal processing device 15. The digital signal processing device 15 performs digital signal processing on the respective obtained signals, and restores information generated in the information generating circuit 1 within the transmitter.

That is, the receiver receives signals having different polarization directions at different sampling timings, performs down-conversion and analog-to-digital conversion on the signals using the frequency of the carrier wave, and restores the information generated in the information generating circuit 1 by performing parallel signal processing on the signal by using the number of respective points on the time axis obtained by dividing the rotation cycle of the polarized waves at the respective sampling timings.

With the aforementioned configuration, the transmitter performs different digital weighting processes on the same digital data at different timings in different polarization directions, and sends the processed data to the receiver. Thus, the transmission waves radiated from the transmitter can be transmitted to the receiver through a plurality of different paths by being multiple-reflected by an electric-field scatterer present between the transmitter and the receiver, and it is possible to improve communication reliability by multiplexing a transmission path.

Next, an operating principle of the radio communication system according to the present embodiment will be described.

FIG. 2 is an example of a configuration diagram of the radio communication system that performs communication at different timings using electromagnetic waves having different polarization directions in an environment in which the electric-field scatterer is present between the transmitter and the receiver according to the present embodiment.

The transmitter 75 performs different weighting processes on the same digital data at different timings using a transmission antenna 70 capable of changing the polarization direction, and transmits the processed data to the receiver 85. Since a line-of-sight communication path is blocked by an appliance 71 present between the transmitter 75 and the receiver 85, the electromagnetic waves radiated from the transmitter simultaneously reach the receiver 85 through a plurality of paths due to multiple reflections caused by a plurality of electromagnetic-wave scatterers 72 present between the transmitter 75 and the receiver 85.

Only the energy of electromagnetic waves which have been passed through paths having a specific relationship due to phase shift related to a path length required between the transmitter and the receiver and phase shift occurring during the reflections by the electromagnetic-wave scaterers 72 is intensified in the receiver. In FIG. 2, such paths are respectively expressed by L1$a$, L1$b$, L2$a$ and L2$b$. Since the phase shift occurring due to the electromagnetic-wave scatterers 72 is shifted due to the polarization directions of the electromagnetic waves incident on the electromagnetic-wave scatterers, when the polarization directions of the electromagnetic waves radiated from the transmitter are different, the specific paths in which the energy of the electromagnetic waves is intensified in the receiver are different.

Accordingly, it is possible to multiplex a path capable of transmitting the electromagnetic waves to the receiver from the transmitter with high intensity by allowing the electromagnetic waves radiated from the transmitter to have a plurality of different polarization directions. Since the electromagnetic waves radiated from the transmitter have only one direction at one time point, when the same signal is radiated from the transmitter at different times, it is possible to respectively use different transmission paths appearing by changing the polarization direction.

Here, the frequency in which the polarization directions of the electromagnetic waves radiated from the transmitter are changed, that is, the rotation frequency of the polarized waves is allowed to be greater than the maximum frequency of the signal to be transmitted to the receiver from the transmitter (maximum frequency of the frequency bandwidth fI generated by the information generating circuit 1 of FIG. 1). Thus, it is possible to equivalently transmit the same signal from the transmitter to the receiver through the plurality of transmission paths, and communication reliability between the transmitter and the receiver is improved. Since the polarization directions of the electromagnetic waves radiated from the transmitter are not maintained by the phase shift during the reflections due to the electromagnetic-wave scatterers 72, the receiver needs to detect electromagnetic waves having various polarization directions received from the transmitter without omission in the plurality of polarization directions. By allowing the frequency in which the polarization direction of a reception antenna is changed to be greater than the maximum frequency of the signal to be transmitted to the receiver from the transmitter, it is possible to equivalently detect the signal without omission in all of the polarization directions with respect to the same signal.

In the present embodiment, the rotation frequency fr of the polarized waves is set to a value which is sufficiently smaller than the frequency fc of the carrier wave. In order to maintain the independence of each frequency ch in the radio communication, the rotation frequency fr of the polarized waves needs to be sufficiently smaller than the width of ch, that is, the frequency bandwidth of the carrier wave.

Next, an operation of the radio communication system will be described in detail. Since the appliance 71 as the electromagnetic-wave scatterer is present between the transmission antenna 70 of the transmitter 75 and the reception antenna 80 of the receiver 85, there is no path which the electromagnetic waves from the transmission antenna 80 directly reach the reception antenna 80. Thus, the reflections due to the plurality of electromagnetic-wave reflecting scatters 72 distributed near the transmitter 75 and the receiver 85 are repeated, and the electromagnetic waves radiated from the transmission antenna 70 reach the reception antenna 80.

A transmission wave 91 transmitted in a first polarization direction using the transmission antenna 70 that rotates the polarization direction by the transmitter 75 reaches the receiver 85 in a third polarization direction, as a reception wave 92 which is a synthesized wave of a reflection wave 93*a* having a path difference L1*a* with a reflection wave 93*b* having a path difference L1*b*. A transmission wave 95 transmitted in a second polarization direction at a different timing by rotating the polarization direction by the transmitter 75 reaches the receiver 85 in a fourth polarization direction, as a reception wave 96 which is a synthesized wave of a reflection wave 97*a* having a path difference L2*a* with a reflection wave 97*b* having a path difference L2*b*. Since the independent polarization directions are two directions perpendicular to each other, the electromagnetic waves having the third and fourth polarization directions are separated in an eleventh polarization direction and a twelfth polarization direction which are different polarization directions by the reception antenna 80 of the receiver that rotates a polarization angle, and are then detected by the receiver 85. Subsequently, the same operation is repeated in the next cycle.

A lower drawing of FIG. 2 shows a time change in the polarization directions of the electromagnetic waves radiated from the transmitter, and shows a state where the polarization directions of the electromagnetic waves are rotated with the frequency fr which is greater than the maximum frequency of the signal to be transmitted from the transmitter to the receiver. In the present embodiment, the transmitter performs different weighting processes on the same signal every ¼ of a cycle corresponding to the frequency fr, and radiates digital data. That is, the same information signal on which different weighting processes are performed is superimposed on carrier waves having the respective polarization angles.

Since the polarization directions of the second-half cycle of the one cycle are made to be the same as those of the first-half cycle by simply inverting the symbols thereof, digital data points of the second-half cycle and digital data points of the first-half cycle pass through the same path, and reach the receiver from the transmitter. In the present embodiment, since the second-half cycle does not contribute to a multiplexing effect of the transmission path, the signal is not transmitted in the second-half cycle by setting the weighting factors to zero, and an effect of reducing the power consumption of the transmitter is obtained.

In this case, when the same signal s and different weighting values w1 and w2 are used in a first cycle and the same signal s and different weighting values w3 and w4 are used in a second cycle, the complex intensities of the electromagnetic waves received in the eleventh polarization direction in the first cycle and the second cycle are expressed by the following expression.

$$w1 \cdot A_{L1} \cdot e^{j\Phi L1} + w2 \cdot A^{L2} \cdot e^{j\Phi L2}, w3 \cdot A_{L1} \cdot e^{j\Phi L1} + w4 \cdot A_{L2} \cdot e^{j\Phi L2} \quad \text{Expression 1}$$

The absolute values obtained through a complex calculation can be calculated by performing digital signal processing on the received signal. The sum of the absolute values of the electromagnetic waves received in the eleventh polarization direction in the first cycle and the second cycle is 2 by using $w1=w3=1/A_{L1}$, $w2=1/A_{L2}$, and $w4=-1/A_{L2}$, and reception signal power is increased by the number of transmission paths. The value of $\Phi_i$ is a phase difference using the frequency of the carrier wave of the used electromagnetic wave as a reference. It is possible to sufficiently obtain the sum of the absolute values of Expression 1 if there is a difference between the values of $\Phi_{L2}$ and $\Phi_{L1}$. This difference is easily obtained during the calculation of the digital signal processing using the frequency of the carrier wave. When the difference between the values of $\Phi^{L2}$ and $\Phi^{L1}$ is obtained, since the values of w1, w2, w3 and w4 are known, the ratio of the values of $A_{L1}$ and $A_{L2}$ is easily obtained, and thus, the maximum value of the sum of the absolute values is obtained. The maximum value can be calculated by creating a complex conjugate signal of the obtained signal through the specific calculation of the sum of the absolute values and calculating the product of the original signal and the complex conjugate signal.

It is possible to allow these weighting symbols to have an orthogonal relationship. That is, in the weighting process used in the transmitter, the original information signal is restored by repeating the cycle using the number of different sampling points in the first cycle of the transmission wave rotated with a first frequency and a plurality of values assigned to these points by the same number as the number of points that exist, and the plurality of values for each cycle is perpendicular to each other. In this manner, it is possible to easily separate and extract signals related to arbitrary position symbols due to the orthogonality of the symbols through digital signal processing of a reception unit. The signals are transmitted with different polarization angles by using the extracted symbols, and thus, an effect of separating and synthesizing incoming waves transmitted through different paths is obtained. Accordingly, it is possible to multiplex the transmission path, and it is possible to improve communication reliability by blocking a specific radio transmission path.

As another example of the weighting process, when different coding processes are performed on weighting symbols, since information signals to be transmitted are transmitted using different codes through different transmission paths, an effect of improving communication security is obtained.

As stated above, in the present embodiment, in the radio wave environment in which the plurality of electromagnetic-wave scatterers is present between the transmitter and the receiver, and the electromagnetic waves radiated from the transmitter interfere with each other due to multiple reflections by the scatterers and reach the receiver, it is possible to realize a plurality of propagation paths between the transmitter and the receiver by implementing the transmission and reception antennas as two antennas that can be integrally formed and in which the polarized waves are perpendicular to each other and by rotating the polarized waves of the electromagnetic waves radiated from the transmitter. The same information signal is multiplied by weighting symbols which are perpendicular to each other, and the processed signals are radiated from the transmitter at different sampling timings in the rotation cycle through the plurality of paths. In the receiver, the plurality of electromagnetic waves propagating through the plurality of paths is received, and the signal on which the plurality of electromagnetic waves is superimposed can be reconfigured by performing the same weighting process, and the amount of information transmitted from the transmission side to the reception side can be increased. Thus, it is possible to increase communication reliability between the transmitter and the receiver while reducing the dimensions of the transmitter and the receiver to be small.

Embodiment 2

In the present embodiment, another example of the weighting process on the digital data in the transmitter of the radio communication system according to the present invention will be described.

Figure 3:
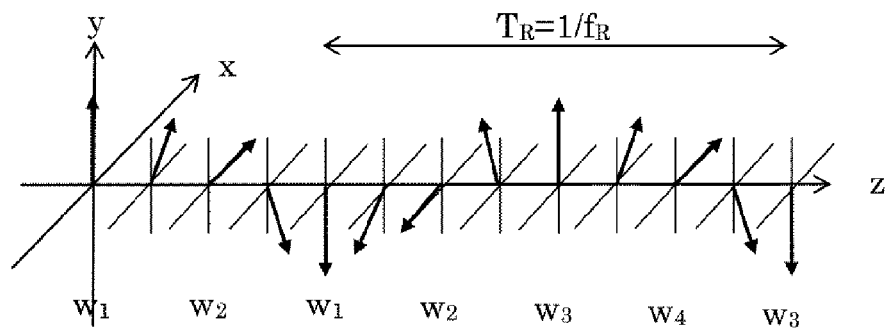
FIG. 3 is an example in which weighted encoding is performed on a signal of the radio communication system according to the present invention.

FIG. 3 is another example of the weighting process on the digital data in the transmitter of the radio communication system according to Embodiment 2. Unlike the embodiment shown in FIG. 2, the same weighting process as that on the digital data points of the first-half cycle is performed on the digital data points of the second-half cycle. Since the polarization directions of the second-half cycle of the one cycle are the same as those of the first-half cycle by simply inverting symbols, the digital data points of the second-half cycle and the digital data points of the first-half cycle pass through the same path, and reach the receiver from the transmitter. Thus, communication reliability between the transmitter and the receiver is not improved, but the energy of the electromagnetic waves that can be transmitted from the transmitter to the receiver is increased in an average time. Accordingly, power that can be transmitted from the transmitter to the receiver can be increased, and it is possible to expand the distance for performing communication between the transmission and reception sides.

Embodiment 3

In the present embodiment, another example of the weighting process on the digital data in the transmitter of the radio communication system according to the present invention will be described.

Figure 4:
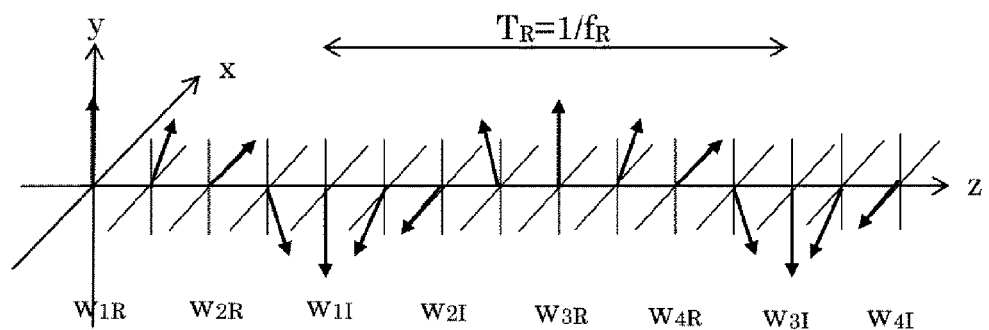
FIG. 4 is an example in which weighted encoding is performed on another signal of the radio communication system according to the present invention.

FIG. 4 is another example of the weighting process on the digital data in the transmitter of the radio communication system according to Embodiment 3. Unlike the embodiment shown in FIG. 2, a weighting process different from the weighting process performed on the digital data points of the first-half cycle is performed on the digital data points of the second-half cycle. Since the polarization directions of the second-half cycle of the one cycle are the same as those of the first-half cycle by simply inverting the symbols, the digital data points of the second-half cycle and the digital data points of the first-half cycle pass through the same path, and reach the receiver from the transmitter. Thus, when an environment change is not considered between the transmitter and the receiver at a speed equal to or greater than the rotation frequency in the polarization direction, it can be expected that data transmission quality in the first-half cycle and data transmission quality in the second-half cycle will be the same.

In the present embodiment, the digital data is transmitted from the transmitter to the receiver by using real numbers as the weighting factors corresponding to the digital data points of the first-half cycle and imaginary numbers as the weighting factors corresponding to the digital data points of the second-half cycle.

According to the present embodiment, since the complex numbers can be used as the symbols added to the information signal to be transmitted from the transmitter to the receiver, a degree of freedom of an algorithm that can be applied to the reconfiguration of the information signal using the weighting factor is greatly increased in the receiver.

Next, an example of a method of generating the digital data of the transmitter of the radio communication system according to Embodiments 1 to 3 will be described.

FIG. 5 is an example of the method of generating the digital data of the transmitter of the radio communication system according to Embodiment 1.

In the radio device of FIG. 1, a time waveform of FIG. 5a is obtained by converting the signal having frequency bandwidth f1 generated by the information generating circuit 1 into the digital signal by the analog-to-digital converter 2. From this time waveform, a time waveform of FIG. 5b is obtained by raising the sampling frequency by the up-sampler 3 and forming new signal points in discrete intervals of the original digital signal.

From this time waveform, a time waveform of FIG. 5c is obtained by copying the values of the original digital signal into the new signal points by the digital sample-hold circuit 4. From this time waveform, a time waveform of FIG. 5d is obtained by sequentially reading weighting factors previously stored in the storage device 6 by the circulation-type signal copying device 5 and multiplying the signal points by the read weighting factors using the multiplying circuits.

The example shown in FIG. 5 is an example in which complex conjugate signals [1, 1, 1, −1] are used as the weighting factors [w1, w2, w3, w4] of Expression 1. According to the present embodiment, it is possible to reconfigure the information signal superimposed on the electromagnetic waves radiated from the transmitter to have double signal intensity by using the signals obtained by the receiver and the complex conjugate signals obtained from these signals. As a result, by using the up-sampler 3 and the digital sample-hold circuit 4, the values of the original digital signal are copied fourfold and these four signals are used as pairs of complex numbers. Ultimately, the signal intensity becomes double which is half of the fourfold. As stated above, it is possible to reduce a digital signal processing load in the receiver by using the complex signals.

When the weighting process is performed using real numbers not the complex numbers, since the fourfold values of the digital signal are multiplied by the real numbers, it is possible to reconfigure the signal intensity of the information signals to be fourfold.

An effect of improving reliability between the transmitter and the receiver is obtained by setting the weighting factors described above.

Embodiment 4

In the present embodiment, another configuration example of the transmitter that realizes the radio communication system according to the present invention will be described.

In order to transmit the electromagnetic waves having different polarization directions from the transmission side to the reception side, in addition to rotating the polarized waves using the device driving unit shown in FIG. 1, when two polarized waves perpendicular to each other and radiated from two antennas are transmitted, the amplitude strengths thereof are preferably allowed to be different. For example, when the both waves are composed by changing amplitude strengths to a sine wave shape and a cosine wave shape over time, it is possible to transmit the electromagnetic waves of which the polarization directions are rotated over time. The present embodiment is an example in which the electromagnetic waves having different polarization directions are transmitted using two antennas.

Figure 6:
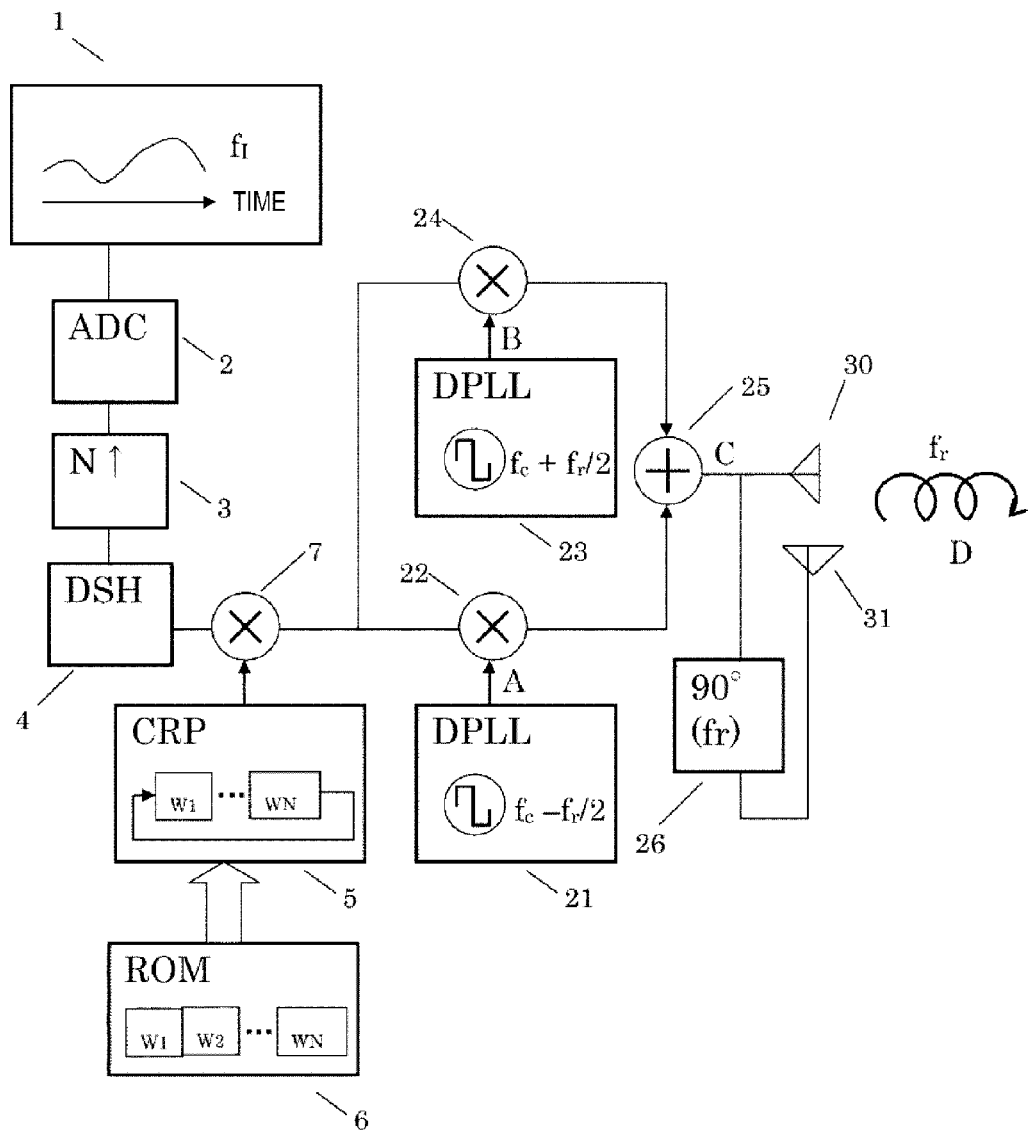
FIG. 6 is an example of a configuration diagram of another transmitter applied to the radio communication system according to the present invention.

FIG. 6 is another configuration example of the transmitter that realizes the radio communication system according to Embodiment 4. The transmitter of the present embodiment is different from the transmitter of FIG. 1 in that a digital signal which is an output of the first multiplier is branched into two, the branched two signals are multiplied by digital carrier waves generated by a first digital oscillator 21 and a second digital oscillator 23 which have a frequency fc-fr/2 and a frequency fc+fr/2 by a first multiplier 22 and a second multiplier 24, the multiplied signals are combined by a combiner 25 and are branched into two again, one signal is radiated from a horizontal polarization transmission antenna 30, and the other signal is radiated from a vertical polarization transmission antenna 31 through a 90° delay unit 26 with respect to the rotation frequency fr in the polarization direction.

According to the present embodiment, since the antennas of which the polarization directions are rotated with a frequency lower than the frequency of the carrier wave can be realized using two vertical polarization antennas which are integrally formed and are perpendicular to each other, the effect of Embodiment 1 can be realized using the small-sized transmitter without including the device driving unit. That is, since the polarized waves perpendicular to each other are independent from each other, it is not necessary to spatially separate these two antennas, and it is possible to arrange the two antennas with a minimum volume.

Figure 7:
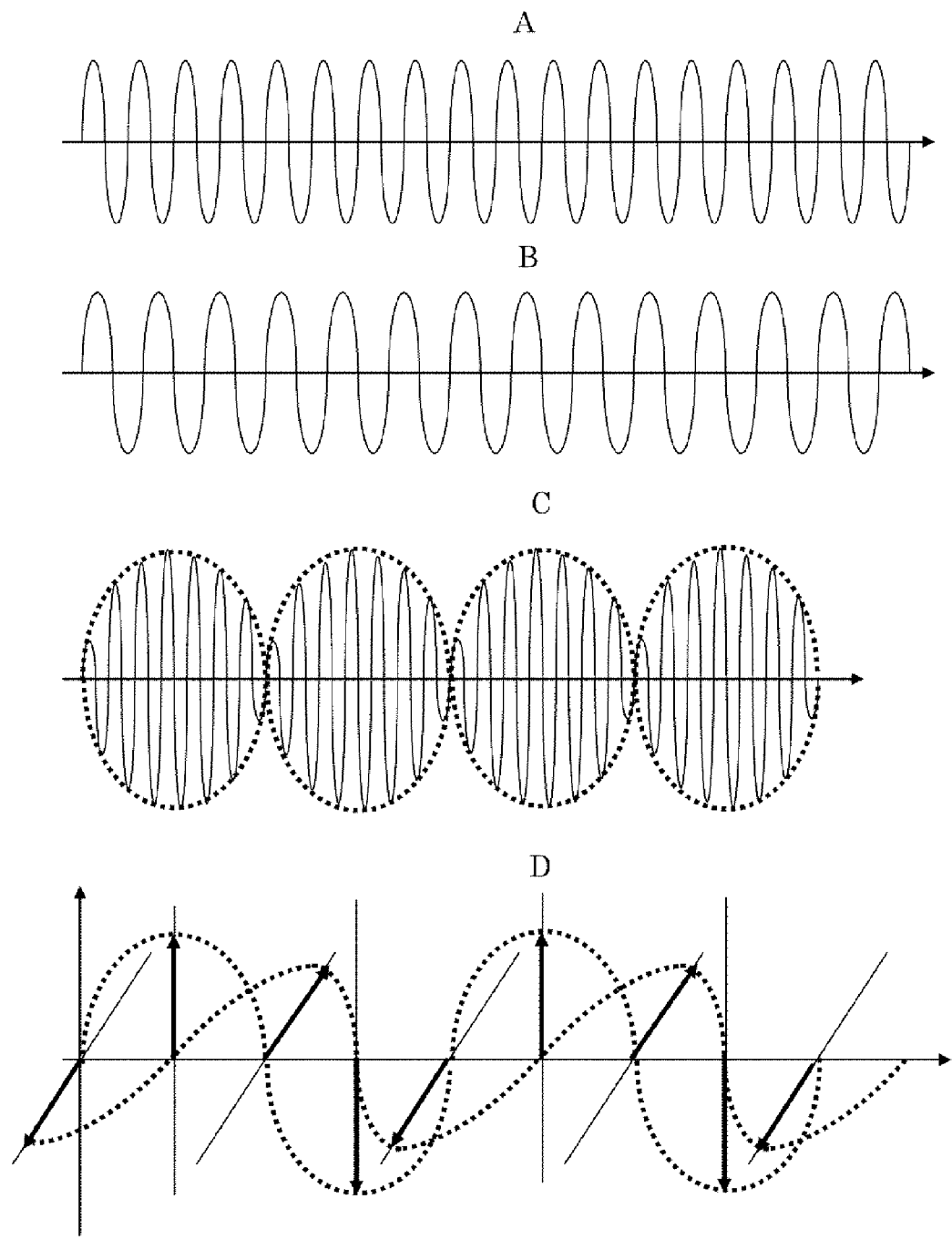
FIG. 7 is a diagram for describing a transmission waveform of the transmitter applied to the radio communication system according to the present invention.

Next, the operation of the transmitter that realizes the radio communication system of Embodiment 4 will be described. FIG. 7 is a diagram for describing the operation of the transmitter that realizes the radio communication system of Embodiment 4.

The transmitter of FIG. 6 generates time waveforms of FIG. 7A and FIG. 7B by the first digital oscillator 21 and the second digital oscillator 23 which have a frequency fc-fr/2 and a frequency fc+fr/2. The information signal having the maximum frequency fI is superimposed on these waveforms, and changes appear in envelope curves thereof. However, since the fI is sufficiently lower than the rotation frequency fr in the polarization direction, the changes are considerably small in this drawing. A time waveform of FIG. 7C is obtained by synthesizing these waveforms by the combiner 25. Since a frequency difference between FIGS. 7A and 7B is small, this difference becomes a bit, and appears as an envelope curve. The oscillation frequency within the envelope curve is considerably greater than the frequency of the envelope curve. When this bit wave is deviated by a quarter of the wavelength of the frequency of the envelope curve and is radiated into the air through the two antennas spatially perpendicular to each other, this bit wave becomes a three-dimensional synthesized waveform of a three-dimensional envelope curve shown in FIG. 7D, and the electromagnetic wave travels in the air while being rotated in the polarization direction thereof. According to the present embodiment, it is possible to generate the electromagnetic wave of which the polarization direction is rotated by using the two linearly polarized antennas perpendicular to each other.

Similarly to the transmitter, the receiver can be realized by using two reception antennas of two polarized waves perpendicular to each other. Specifically, one signal is multiplied by a first amplitude coefficient, and the other signal is delayed by a delay difference corresponding to a quarter of the rotation cycle of the polarized waves and is multiplied by a second amplitude coefficient. Thus, the first and second amplitude coefficients are expressed as a sine function and a cosine function which have the rotation cycle of the polarized waves, and parallel signal processing is performed on the sum thereof by the number of respective points on the time axis obtained by dividing the rotation cycle of the polarized waves at the sampling timings.

Embodiment 5

In the present embodiment, another configuration example of the transmitter and the receiver applied to the radio communication system of the present invention will be described.

Figure 8:
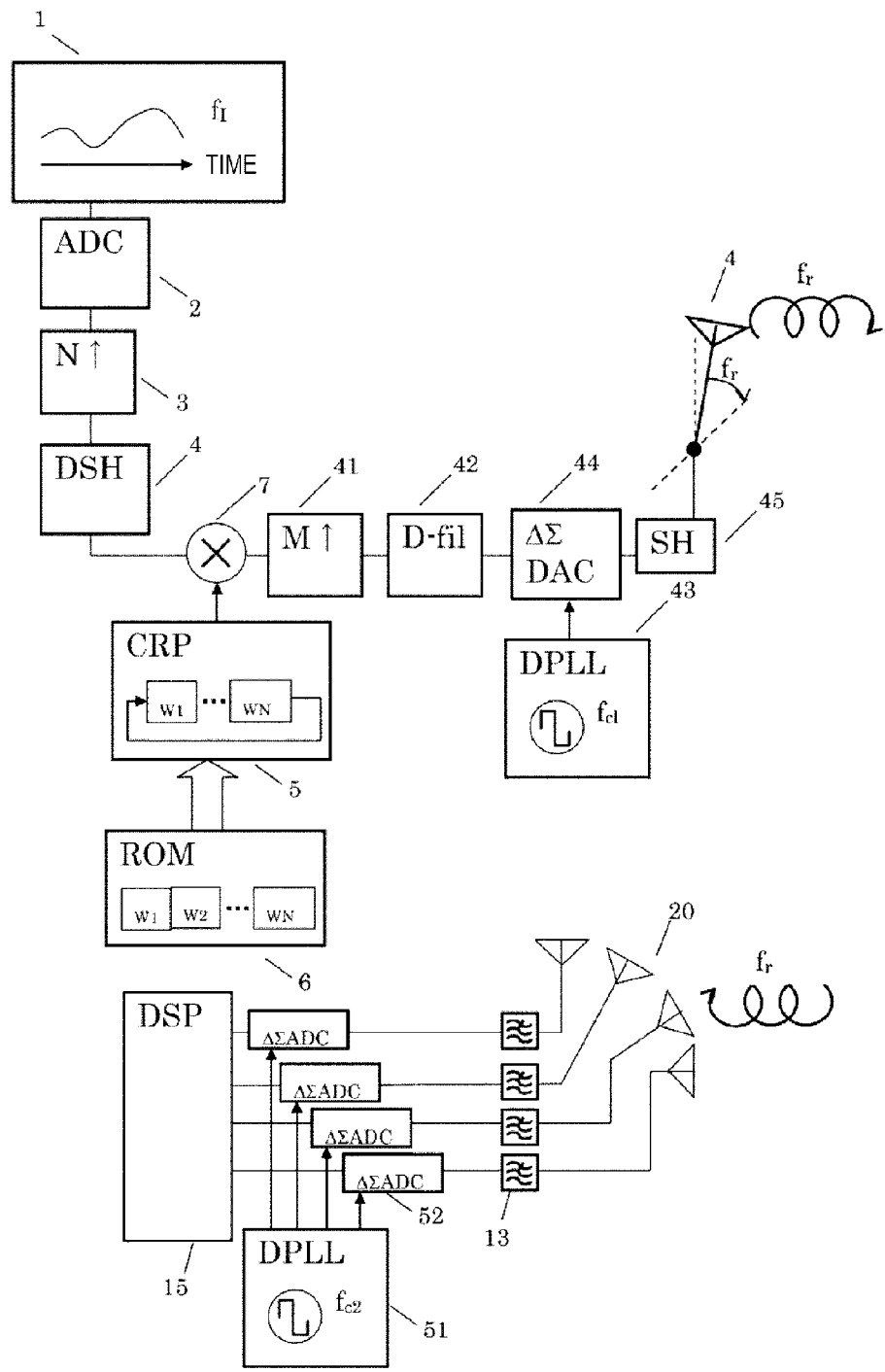
FIG. 8 is an example of a configuration diagram of another transmitter and another receiver applied to the radiocommunication system according to the present invention.

FIG. 8 is an example of a configuration example of the transmitter and the receiver that realize the radio communication system of the present embodiment. The description of portions of the radio device of FIG. 8 that performs polarization angle division diversity which have the same functions as those of FIG. 1 described above will be omitted. The transmitter of the present embodiment is different from the transmitter of the embodiment shown in FIG. 1 in that the weighted digital information signal which is the output of the first multiplier 7 is up-sampled by the cascade-connected circuits of a digital filter 42 and an interpolator 41 and is converted into a 1-bit digital signal by a delta-sigma modulator 44 to which clocks are supplied from a transmission digital clock circuit 43 having a frequency fc1, and the signal is converted into an analog signal by a sample-hold circuit 45 and is radiated into the air by a transmission antenna 4.

According to the present embodiment, since the frequency of the digital clock circuit 43 can be lower than the frequency of the digital transmitter 8 using the frequency converting function of the delta-sigma modulator 44, it is possible to lower the maximum operation frequency of the digital signal processing of the transmitter, and an effect of reducing the power consumption of the same transmitter is obtained.

The receiver of the present embodiment is different from the receiver of the embodiment shown in FIG. 1 in that the analog signal detected by the linearly polarized antenna 20 is converted into a digital signal by a delta-sigma analog-to-digital converting circuit 52 to which clocks are supplied from a digital clock circuit 51 having a frequency fc2, and the converted signal is supplied to the digital signal processing device 15.

According to the present embodiment, since the analog mixer 12 and the local oscillator 11 which are difficult to achieve long lifespan and atonality due to change over the years and temperature change can be replaced with digital circuits appropriate to achieve long lifespan and atonality, an effect of improving device reliability of transmitter and receiver applied to the radio communication system of the present invention is obtained.

Embodiment 6

In the present embodiment, another configuration example of the transmitter applied to the radio communication system of the present invention will be described.

Figure 9:
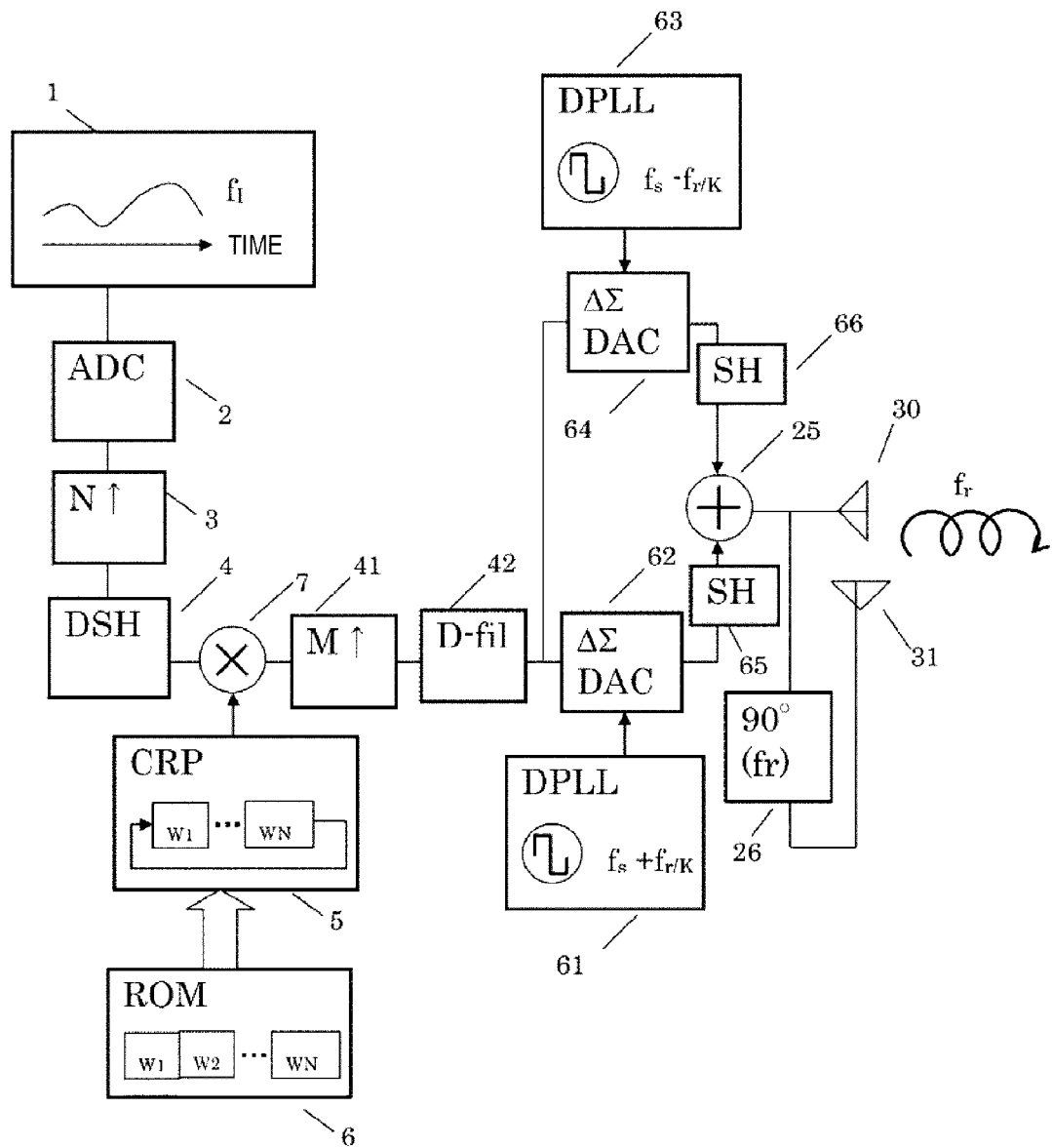
FIG. 9 is an example of a configuration diagram of another transmitter applied to the radio communication system according to the present invention.

FIG. 9 is an example of a configuration diagram of the transmitter and the receiver that realize the radio communication system of the present embodiment. The description of portions of the radio device of FIG. 9 that performs polarization angle division diversity which have the same functions as those of FIG. 6 described above will be omitted. The transmitter of the present embodiment has a difference from the transmitter of the embodiment shown in FIG. 6 in that the weighted digital information signal which is the output of the first multiplier 7 is up-sampled by the cascade-connected circuits of the interpolator 41 and the digital filter 42 and is branched into two, one signal thereof is converted into a 1-bit digital signal by the delta-sigma modulator 62 to which clocks are supplied from a transmission digital clock circuit 61 having a frequency fs+fr/K and then is converted into an analog signal by a sample-hold circuit 65, and the other signal thereof is converted into a 1-bit digital signal by a delta-sigma modulator 64 to which clocks are supplied from a transmission digital clock circuit 63 having a frequency fs−fr/K and then is converted into an analog signal by a sample-hold circuit 66. These signals are synthesized by the combiner 25, and the synthesized signal is branched into two again. One signal is radiated through the horizontal polarization transmission antenna 30, and the other signal is radiated through the vertical polarization transmission antenna 31 through the 90° delay unit 26 with respect to the rotation frequency fr in the polarization direction.

According to the present embodiment, since the frequencies of the digital clock circuits 61 and 63 can be lower than the frequencies of the first digital oscillator 21 and the second digital oscillator 23 by using the frequency converting function of the delta-sigma modulators 62 and 64, it is possible to lower the maximum operation frequency of the digital signal processing of the transmitter, and an effect of reducing the power consumption of the transmitter is obtained.

Embodiment 7

In the present embodiment, a configuration example of the communication system using the radio device that performs the polarization angle division diversity of the present invention will be described.

Figure 10:
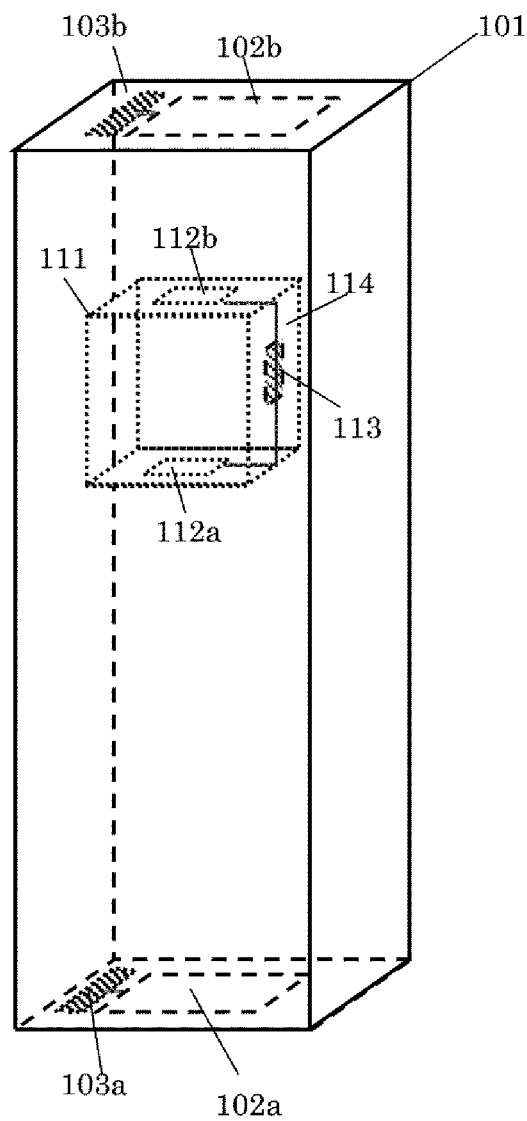
FIG. 10 is an example of a configuration diagram of an elevator system to which the radio communication system according to the present invention is applied.

FIG. 10 is an example of a configuration diagram of an elevator system to which the polarization angle division diversity radio device of the present embodiment is applied. In an elevator system 100 of the present embodiment, an elevating cage 111 moves up and down within a building 101 in which an elevator is provided. Base-station dual quadrature polarization integrated antennas 102 and base-station radio devices 103 having the polarization angle division diversity function are respectively provided by being coupled at the floor and the ceiling within the building 101. Terminal-station dual quadrature polarization integrated antennas 112 are respectively provided at the external ceiling and the external floor of the elevating cage 111, and are coupled to a terminal radio device 113 using a high-frequency cable 114. Since the base-station radio devices 103 and the terminal-station radio devices 113 establish the inside of the building 101 as a radio transmission medium, the electromagnetic waves are multiple-reflected by the inner wall of the building 101 and the outer wall of the elevator to form a multipath-wave interference environment. In the present embodiment, since high-quality radio transmission can be realized even under the multipath-wave interference environment due to the polarization angle division diversity, the elevating cage 111 can be remotely controlled and monitored by the building 101 by using wireless connection means using this radio device without including wired connection means. Thus, since the wired connection means such as a cable can be removed, the same transmission capacity can be realized with a smaller building volume, or transmission capacity can be improved by increasing the size of the elevator with the same building volume.

Embodiment 8

In the present embodiment, another configuration example of the communication system using the radio device that performs the polarization angle division diversity of the present invention will be described.

Figure 11:
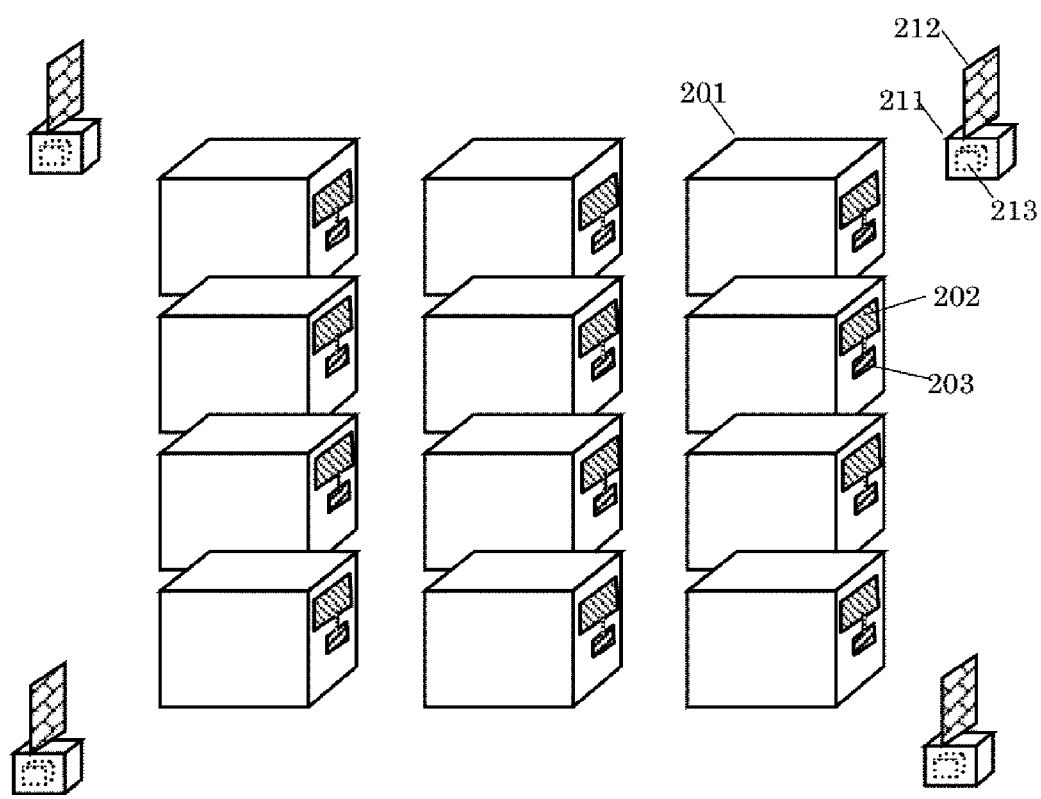
FIG. 11 is an example of a configuration diagram of a substation facility monitoring system to which the radio communication system according to the present invention is applied.

FIG. 11 is an example of a configuration example of a substation facility monitoring system to which the polarization angle division diversity of the present embodiment is applied. A substation facility monitoring system 200 of the present invention includes a plurality of substation facilities 201, and a terminal-station radio device 203 that performs polarization angle division diversity and a terminal-station dual quadrature polarization integrated antenna 202 are provided by being coupled at the substation facility 201. A plurality of base station equipment having the number smaller than the number of substation facilities 201 is provided near the plurality of substation facilities 201, and the base-station dual quadrature polarization integrated antenna 212 and the base-station radio device 213 that performs the polarization angle division diversity of the present invention are provided by being coupled at the base station equipment 211. Since the dimension of the substation facility is in the order of several meters and is overwhelmingly greater than the wavelength corresponding to several hundreds of MHz to several GHz which is the frequency of the electromagnetic wave used by the radio device, the electromagnetic waves are multiple-reflected by the plurality of substation facilities 201 to form the multipath-wave interference environment. In the present invention, since high-quality radio transmission can be realized by the polarization angle division diversity even in the multipath-wave interference environment, the substation facility 201 can be remotely controlled and monitored by the plurality of radio base station equipment 211 using the wireless connection means using this radio device without including the wired connection means. Thus, the problem of high-pressure inductive power generated due to the use of the wired connection means such as a cable can be solved, and the cable laying cost can be reduced. Thus, effects of improving safety of the controlling and monitoring system of the substation facility 201 and reducing cost are obtained.

The present invention is not limited to the aforementioned embodiments, and includes various modification examples. For example, the aforementioned embodiments are described in detail in order to easily understand the present invention, and are not necessarily limited to including all of the above-described configurations. Some of the configurations of a certain embodiment may be replaced with the configurations of another embodiment, and the configurations of another embodiment may be added to the configurations of a certain embodiment. Other configurations may be added to some of the configurations of the respective embodiments, or some of the configurations thereof may be removed or replaced with other configurations.

Some or all of the aforementioned configurations, functions, processing units and processing means may be implemented as hardware by being designed with, for example, an integrated circuit. The aforementioned configurations and functions may be implemented as software by interpreting programs for implementing the functions by a processor and executing the programs. Information regarding programs, tables and files that implement the functions may be stored in a recoding device such as a memory, a hard disc or a solid state drive (SSD), or a recoding medium such as an IC card, a SD card or a DVD.

Control lines or information lines that are considered as being required for the description are only illustrated, and it may not be necessarily limited that all of the control lines and information lines are illustrated on the product. It may be considered that almost all of the configurations are actually connected each other.

REFERENCE SIGNS LIST

1 . . . Information generating circuit, 2 . . . Analog-to-digital converter, 3 . . . Up-sampler, 4 . . . Digital sample-hold circuit, 5 . . . Circulation-type signal copying device, 6 . . . Storage device, 7 . . . First multiplier, 8 . . . Digital oscillator, 9 . . . Second multiplier, 10 . . . Transmission antenna, 11 . . . Local oscillator, 12 . . . Analog mixer, 13 . . . Filter, 14 . . . Analog-to-digital converting circuit, 15 . . . Digital signal processing device, 20 . . . Linearly polarized antenna, 21 . . . Digital transmitter, 22 . . . Multiplier, 23 . . . Digital transmitter, 24 . . . Multiplier, 25 . . . Combiner, 26 . . . 90° delay circuit, 30 . . . Horizontal polarization transmission antenna, 31 . . . Vertical polarization transmission antenna, 41 . . . Interpolator, 42 . . . Digital filter, 43 . . . Transmission digital clock circuit, 44 . . . Delta-sigma modulator, 45 . . . Sample-hold circuit, 51 . . . Reception digital clock circuit, 52 . . . Delta-sigma analog-to-digital converting circuit, 61 . . . Transmission digital clock circuit, 62 . . . Delta-sigma modulator, 63 . . . Transmission digital clock circuit, 64 . . . Delta-sigma modulator, 65 . . . Sample-hold circuit, 66 . . . Sample-hold circuit, 70 . . . Transmission antenna, 71 . . . Appliance, 72 . . . Electromagnetic-wave scatterer, 75 . . . Transmitter, 80 . . . Reception antenna, 85 . . . Receiver, 91 . . . Transmission wave, 92 . . . Reception wave, 93 . . . Reflection wave, 95 . . . Transmission wave, 96 . . . Reception wave, 97 . . . Path, 100 . . . Elevator system, 101 . . . Building, 103 . . . Base-station radio device, 102 . . . Base-station dual quadrature polarization integrated antenna, 111 . . . Elevating cage, 113 . . . Terminal-station radio device, 112 . . . Terminal-station dual quadrature polarization integrated antenna, 200 . . . Substation facility monitoring system, 201 . . . Substation facility, 202 . . . Terminal-station dual quadrature polarization integrated antenna, 203 . . . Terminal-station radio device, 211 . . . Base station equipment, 212 . . . Base-station dual quadrature polarization integrated antenna, 213 . . . Base-station radio device

The invention claimed is:

1. A radio communication system comprising:
a radio transmitter configured to up-sample an information signal, copy the sampled information signal into a plurality of copied information signals, multiply the copied information signals by a plurality of predetermined weighting factors, modulate the multiplied information signals with a carrier wave, and wirelessly transmit the modulated information signals in time-series as polarized transmission waves having different polarization angles which are rotated at a same predetermined rotation frequency; and
a radio receiver configured to receive the polarized transmission waves transmitted from the radio transmitter, and demodulate the modulated information signals corresponding to the polarized transmission waves.

2. The radio communication system according to claim 1, wherein the predetermined rotation frequency is lower than a frequency of the carrier wave, and is higher than a maximum frequency of the information signal.

3. The radio communication system according to claim 1, wherein the radio transmitter is further configured to divide a time axis of the information signal so as to correspond to a cycle of the predetermined rotation frequency, and multiply the copied information signal assigned to respective divided points on the time axis by the predetermined weighting factors, and
the predetermined weighting factors are determined repeatedly for each half of the cycle of the predetermined rotation frequency.

4. The radio communication system according to claim 1, wherein the radio transmitter is further configured to divide a time axis of the information signal so as to correspond to a cycle of the predetermined rotation frequency, and multiply the copied information signal assigned to respective divided points on the time axis by the predetermined weighting factors,
the predetermined weighting factors for the information signal assigned to a first-half cycle of the predetermined rotation frequency and the predetermined weighting factors for the information signal assigned to a second-half cycle of the predetermined rotation frequency are expressed as real numbers and imaginary numbers of complex numbers, and
the radio receiver is further configured to demodulate the modulated information signals using the predetermined.

5. The radio communication system according to claim 1, wherein the radio transmitter includes at least two transmission antennas that are arranged in directions crossing each other, and
the radio transmitter is further configured to superimpose the information signal on two carrier waves of which a frequency difference therebetween is approximately the predetermined rotation frequency of the polarized transmission waves, synthesize the two carrier waves to generate a beat signal causing a beat with approximately the predetermined rotation frequency of the polarized transmission waves, branch the beat signal into two beat signals, delay one of the two beat signals such that a phase difference between the two beat signals is a quarter of a rotational cycle of the polarized transmission waves, and transmit the beat signals to the two transmission antennas.

6. The radio communication system according to claim 1, wherein the radio transmitter includes a delta-sigma modulator and that receives the multiplied information signals and superimposes the multiplied information signal on the carrier wave.

7. The radio communication system according to claim 6, wherein the delta-sigma modulator is an under-sampling type.

8. The radio communication system according to claim 1, wherein the radio receiver is further configured to multiply the polarized transmission waves which have the different polarization angles by a frequency of the carrier wave, perform analog-digital conversion on the polarized transmission waves, and demodulate the information signal therefrom using the weighting factors multiplied by the radio transmitter so as to correspond to a cycle of the predetermined rotation frequency.

9. The radio communication system according to claim 8, wherein the radio receiver includes at least two reception antennas arranged in directions crossing each other, the radio receiver is further configured to multiply the polarized transmission wave received from one of the reception antennas by a first amplitude coefficient, and delay the polarized transmission wave received from the other of the reception antennas to be delayed by a quarter of the rotation cycle of the polarized transmission waves, and multiply the delayed signal by a second amplitude coefficient, and the first amplitude coefficient and second amplitude coefficient are expressed as a sine function and a cosine function which have the rotation cycle of the polarized transmission waves, and parallel signal processing is performed on the sum thereof by a number of points on a time axis obtained by dividing the rotation cycle of the polarized transmission waves at sampling timings.

10. The radio communication system according to claim 8, wherein the radio receiver performs down-conversion and analog-to-digital conversion on the polarized transmission waves by using a delta-sigma modulator.

11. The radio communication system according to claim 10, wherein the delta-sigma modulator is an under-sampling type.

12. A radio transmitter, comprising:
a processor; and
a storage device storing instructions that, when executed by the processor, cause the processor to be configured to:
up-sample an information signal,
copy the sampled information signal into a plurality of copied information signals,
multiply the copied information signals by a plurality of predetermined weighting factors,
modulate the multiplied information signals with a carrier wave, and
wirelessly transmit the modulated information signals in time-series as polarized transmission waves having different polarization angles which are rotated at a predetermined rotation frequency.

13. A radio receiver that receives polarized transmission waves having different polarization angles which are rotated at a predetermined rotation frequency as transmitted wirelessly from a radio transmitter, the radio receiver comprising:
a processor; and
a storage device storing instructions that, when executed by the processor, cause the processor to be configured to:
receive the polarized transmission waves having the different polarization angles which are rotated at the predetermined rotation frequency,
multiply each of the polarized transmission waves by a frequency of a carrier wave,
perform analog-to-digital conversion on the multiplied waves, and
demodulate an information signal from the digitized waves using a plurality of weighting factors, as applied by the radio transmitter, that corresponds to a particular cycle of the predetermined rotation frequency.

14. The radio communication system according to claim 1, wherein the radio transmitter and the radio receiver are disposed in an elevator system.

15. The radio communication system according to claim 1, wherein the radio transmitter and the radio receiver are disposed in a substation facility monitoring system.

* * * * *